(12) United States Patent
Lambinet (10) Patent No.: US 11,092,131 B2
(45) Date of Patent: Aug. 17, 2021

(54) SPEED LIMITING TURBINE FOR A CONDUIT

(71) Applicant: SAVE INNOVATIONS, Grenoble (FR)

(72) Inventor: Gilles Lambinet, Meylan (FR)

(73) Assignee: SAVE INNOVATIONS, Grenoble (FR)

( * ) Notice: Subject to any disclaimer, the term of this patent is extended or adjusted under 35 U.S.C. 154(b) by 9 days.

(21) Appl. No.: 16/096,155

(22) PCT Filed: Apr. 25, 2017

(86) PCT No.: PCT/EP2017/059713
§ 371 (c)(1),
(2) Date: Oct. 24, 2018

(87) PCT Pub. No.: WO2017/186667
PCT Pub. Date: Nov. 2, 2017

(65) Prior Publication Data
US 2019/0136826 A1    May 9, 2019

(30) Foreign Application Priority Data

Apr. 26, 2016 (FR) ...................................... 1653675

(51) Int. Cl.
*F03B 15/18* (2006.01)
*F03B 3/04* (2006.01)
(Continued)

(52) U.S. Cl.
CPC ................ *F03B 15/18* (2013.01); *F03B 3/04* (2013.01); *F03B 11/004* (2013.01); *F03B 13/00* (2013.01);
(Continued)

(58) Field of Classification Search
CPC .......... F03B 15/02; F03B 15/04; F03B 15/06; F03B 15/16; F03B 15/18; F03B 3/04;
(Continued)

(56) References Cited

U.S. PATENT DOCUMENTS 3,370,465 A    2/1968    Belle
3,613,451 A    10/1971   Scott
(Continued)

FOREIGN PATENT DOCUMENTS

CN    103775139 A    5/2014
CN    105074177 A    11/2015
(Continued)

OTHER PUBLICATIONS

International Search Report and Written Opinion dated Jul. 6, 2017 issued in corresponding application No. PCT/EP2017/059713; w/ English partial translation and partial machine translation (18 pages).
(Continued)

*Primary Examiner* — Christopher Verdier
*Assistant Examiner* — Elton K Wong
(74) *Attorney, Agent, or Firm* — Westerman, Hattori, Daniels & Adrian, LLP (57) ABSTRACT

A turbine (1) for a conduit comprising a turbine unit (13) including a rotor (3), characterized in that the turbine (1) comprises a speed limiting device for said turbine unit (13), which device comprises at least one flexible element (4) connected to the turbine unit (13), so as to limit the flow rate of the fluid passing through the rotor (3) in order to limit the rotational speed of the rotor (3) of the turbine unit (13).

15 Claims, 5 Drawing Sheets

(51) Int. Cl.
*F03B 11/00* (2006.01)
*G01F 1/12* (2006.01)
*G01F 1/10* (2006.01)
*F03B 13/00* (2006.01)
*G01F 1/115* (2006.01)

(52) U.S. Cl.
CPC .............. *G01F 1/10* (2013.01); *G01F 1/115* (2013.01); *G01F 1/12* (2013.01); *F05B 2220/20* (2013.01); *F05B 2220/706* (2013.01); *F05B 2270/1011* (2013.01); *Y02E 10/20* (2013.01)

(58) Field of Classification Search
CPC ........ F03B 11/004; F03B 13/00; F03B 13/10; F03B 13/105; G01F 1/10; G01F 1/115; G01F 1/12; G01F 15/185; G01F 19/00–007; G01F 3/00–38; F05B 2220/20; F05B 2220/706; F05B 2270/1011; F03D 1/04; F01D 1/00; F01D 17/08; F01D 21/02
USPC ................................................ 73/861.74–84
See application file for complete search history.

(56) References Cited

U.S. PATENT DOCUMENTS

| | | | |
|---|---|---|---|
| 3,813,940 A | 6/1974 | Sommer | |
| 4,531,888 A * | 7/1985 | Buchelt | F03B 3/04 415/148 |
| 6,246,126 B1 * | 6/2001 | Van Der Veken | F03D 7/02 290/55 |
| 2005/0069413 A1 | 3/2005 | Wobben | |
| 2007/0145751 A1 * | 6/2007 | Roos | F03B 13/00 290/52 |
| 2008/0022920 A1 * | 1/2008 | Custodis | F03B 13/00 116/202 |
| 2018/0291761 A1 * | 10/2018 | Peleg | F01D 17/148 |

FOREIGN PATENT DOCUMENTS

| | | |
|---|---|---|
| GB | 1045007 A | 2/1968 |
| GB | 1 323 125 A | 7/1973 |
| JP | 2001-234844 A | 8/2001 |
| WO | 03/054386 A1 | 7/2003 |
| WO | 2006/016012 A1 | 2/2006 |
| WO | 2006/035119 A1 | 4/2006 |
| WO | 2015/044795 A1 | 4/2015 |

OTHER PUBLICATIONS

French Search Report and Written Opinion dated Jul. 6, 2017 issued in priority application No. FR1653675; w/ English machine translation (14 pages).

Chinese Office Action dated Dec. 5, 2019 in counterpart Chinese patent application No. 201780034499.X (English translation; 18 pages) (WO2006/035119, WO2015/044795, WO2006/016012, WO03/054386, GB1045007 and U.S. Pat. No. 3,813,940 cited in the Chinese Office Action are not listed in this IDS since they were already listed in the IDS filed Oct. 24, 2018, respectively).

* cited by examiner

SPEED LIMITING TURBINE FOR A CONDUIT

The invention relates to an electricity generation turbine for a conduit comprising a turbine unit including a rotor and a speed limiting system. It also relates to a system comprising a sensor that is electrically powered by such a turbine for a conduit.

When a turbine is placed inside a conduit carrying a hydraulic or pneumatic fluid in order to convert part of the energy of the flow of the fluid into electrical energy, situations occur in which the fluid that flows in the conduit exhibits significant speed variations. In particular, a pipe must be able to tolerate a substantial increase in flow in order to meet fire safety standards and to be able to accept the flow rate that corresponds to that of a fire hydrant. However, when a turbine undergoes significant speed variations several problems arise. If the turbine is designed for a restricted speed range, it can be damaged by a flow flowing at an excessively high speed. On the other hand, if a turbine is overdesigned in order to withstand a possible overspeed of the fluid, this involves a very high additional cost for the turbine. Furthermore, this overdesign is unjustified since for most of the time the turbine operates with a fluid flow rate at a normal or low speed, and under no circumstances would it achieve a worthwhile yield at these excessive speeds. Attempts to find a compromise between these conflicting constraints have not provided satisfactory solutions in the prior art.

Thus, a general aim of the present invention is to propose a turbine solution for a conduit that is able to address the aforementioned constraints, whilst overcoming the disadvantages of the solutions of the prior art.

More specifically, an aim of the invention is to provide a turbine for a conduit that is simple and inexpensive and is adapted for use in a conduit in which a fluid can circulate at a flow rate that can exhibit significant speed variations, possibly during short time periods, particularly in the event of the operation of a fire hydrant.

To this end, the invention is based on an electricity generation turbine for a conduit comprising a turbine unit including a rotor, characterized in that the turbine comprises a speed limiting device that comprises at least one flexible element connected to the turbine unit, so as to limit the flow rate of the fluid passing through the rotor in order to limit the rotational speed of the rotor of the turbine unit. To this end, the at least one flexible element may or may not allow the turbine unit to move, so that the flow rate of the fluid passing through the rotor may or may not be limited.

The connection of the at least one flexible element with the turbine unit can be such that the thrust generated by the fluid on the turbine unit is able to cause the turbine unit to move against the at least one flexible element, particularly along the flow axis of the fluid if the thrust of the fluid exceeds a predefined threshold.

The connection between the turbine unit and the at least one flexible element can be such that said flexible element keeps the turbine unit in its initial position during normal operation if the rotational speed of the rotor of the turbine unit is below a predefined speed threshold.

The at least one flexible element can be pre-stressed during its assembly with the turbine unit, so as to maintain the stability of the normal operation of the turbine unit, during which normal operation the rotational speed of the rotor of the turbine unit is below a predefined speed threshold.

The predefined speed threshold of the rotor can be between 1,000 and 4,000 revolutions per minute inclusive.

The turbine unit can be designed to be positioned inside a conduit or a turbine body carrying a fluid, and part of the at least one flexible element can be connected to the turbine unit and another part can be designed to be a connection with the conduit or the turbine body, so that the turbine unit is flexibly movable relative to the conduit or the turbine body.

The turbine unit can have an inlet end for the fluid and an outlet end for the fluid and the turbine unit can be provided with at least one rear stop for at least one flexible element, particularly a linear spring, the first end of which is fixed on the rear stop and the second end of which is fixed to the conduit or to the turbine body.

The turbine for a conduit can comprises a turbine body, inside which the turbine unit is arranged, and said turbine unit can comprise a non-rotating part having an outer surface cooperating with the inner surface of the turbine body.

The internal volume of the turbine body can comprise a variable section in the longitudinal direction, so that when the turbine unit is moved during overspeed operation against the at least one flexible element under the effect of the thrust of the fluid, its front part is located at a zone with a section that is larger than the turbine body than when it is in normal, non-moved, operation, so as to allow a greater amount of fluid flowing in the turbine body to pass outside the rotor of the turbine unit.

When the turbine unit is in overspeed operation, the flow rate of the fluid flowing between the inner surface of the turbine body and the outer surface of the non-rotating part of the turbine unit can increase.

During normal operation of the turbine unit, its non-rotating part can be in abutment against a turbine body or a surface of a conduit, so that all the fluid originating from an upstream conduit passes through the rotor of the turbine unit.

The turbine body can be made up of two front and rear semi-bodies, the at least one flexible element can be connected, on the one hand, to the turbine unit, and, on the other hand, to the rear semi-body of the turbine body, and the inner surface of the turbine body can be in contact with the profiled outer surface of the turbine unit, so as to guide the movement of the turbine unit when said unit switches from normal operation to overspeed operation, or vice versa, under the effect of the thrust of the fluid.

The turbine body can comprise two disks, including a first front disk forming a connection device for an upstream conduit and a second rear disk forming a connection device for a downstream conduit.

The invention also relates to a system for measuring at least one characteristic of a fluid flowing in a conduit, characterized in that it comprises at least one sensor capable of measuring at least one characteristic value of a fluid passing through the conduit, and in that at least one sensor is electrically connected to a turbine for a conduit as previously described for supplying said at least one sensor with power.

These aims, features and advantages of the present invention will be described in detail throughout the following description of a particular embodiment, which is provided by way of a non-limiting example, with reference to the accompanying figures, in which.

In order to facilitate the description, by convention the longitudinal direction will be used for the direction of the axis of the turbine, and the adjectives "front" and "rear" will be considered in the direction of a flow of fluid through the turbine.

FIGS. 1 to 4 show a turbine 1 according to one embodiment of the invention in normal operation. This turbine 1 comprises a turbine unit 13 and is provided with at least one flexible element 4.

The turbine unit 13 is made up of a non-rotating part 2 encompassing the stator of the generator 6 and disposed in an annular configuration. It also comprises a rotor 3 disposed at the center, which rotor comprises an inductor rotor, the permanent magnets of which are disposed on the periphery of the blades 9 of the turbine. Finally, the turbine unit 13 comprises electrical connection means 19 electrically connecting the electrical connection terminals of the stator of the generator 6 to the outside of the turbine body 11, which will be described hereafter.

The non-rotating part 2 comprises an outer surface 10 that is profiled on its periphery. The non-rotating part 2 is provided with at least one rear stop 14, on which an end of a flexible element 4 comes into abutment or is connected. According to the embodiment, the outer surface 10 comprises ribs 18, which extend over almost its entire length, from the front to the rear. The rear end of the ribs 18 forms the aforementioned rear stops 14. Passageways for a fluid are created between these ribs 18, as will be described hereafter. To this end, the shape of the outer surface 10 is profiled in order to promote such a flow.

According to the embodiment, the turbine 1 also comprises a turbine body 11 arranged around the turbine unit 13. It is formed by two front and rear semi-bodies, fixed together on the central periphery by screws and bolts, in order to facilitate the assembly of the turbine. This turbine body 11 has cylindrical symmetry with an axis coinciding with the axis of rotation of the rotor 3. The inner volume of the turbine body 11 has a section with a variable dimension in the longitudinal direction.

In this embodiment, a plurality of elastic elements 4, namely longitudinally oriented linear springs, are evenly disposed around the turbine unit. The first end of each of these springs is fixed on a rear stop 14 formed by the ribs 18 and the second end is fixed to the turbine body 11, toward the rear of the turbine body. These flexible elements 4 are mounted in a pre-stressed manner when the turbine unit 13 is assembled with the turbine body 11. By way of a variation, the flexible elements can be in a different form and/or can have a different number and arrangement. They thus can be wave springs, in a circular housing, or gas actuators, etc.

Figure 7:
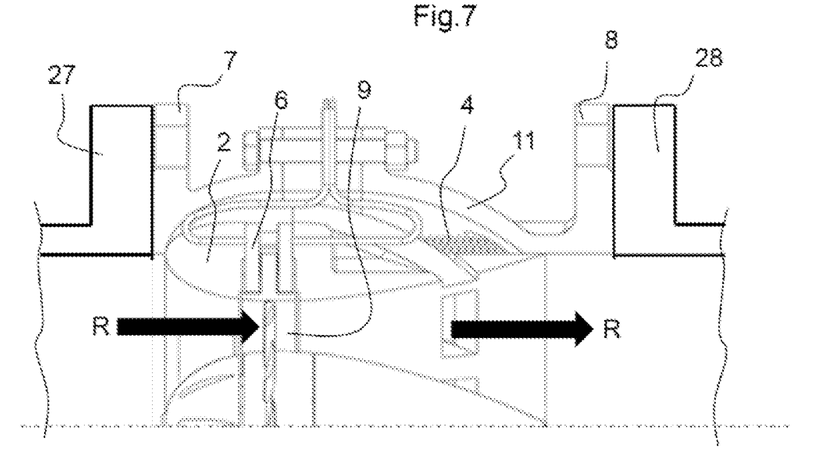
FIG. 7 shows a schematic and functional longitudinal section view of the turbine during normal operation, according to the embodiment of the invention.
Figure 8:
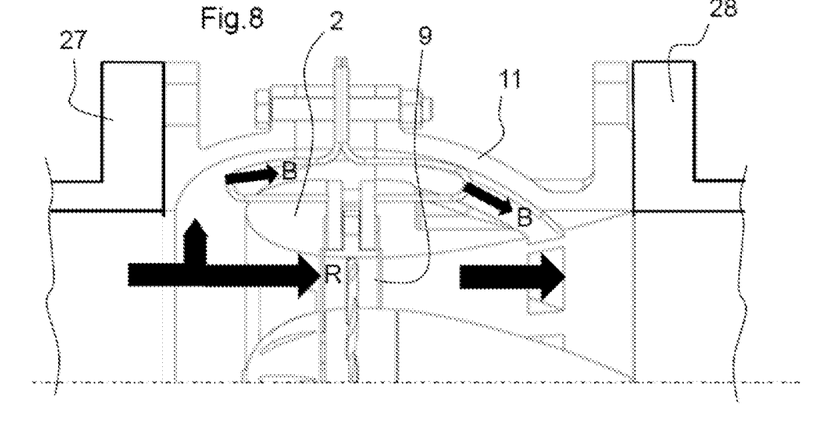
FIG. 8 shows a schematic and functional longitudinal section view of the turbine during overspeed operation, according to the embodiment of the invention.

The turbine 1 is intended to be located inside a pipe conduit, as shown in FIGS. 7 and 8. According to this embodiment, the turbine body 11 comprises two front 7 and rear 8 disks in the vicinity of the ends thereof, forming connection devices so that they can be respectively fixed to an upstream 27 and downstream 28 conduit. These connection devices particularly comprise openings for fixing by means of nuts and bolts. In such an assembly, the axis of the turbine unit 13 coincides with the central axis of the fluid flow conduit. Therefore, the turbine 1 is located in a section of pipe for circulating a fluid, particularly in a conduit intended for long-distance transportation or for the distribution of a fluid, such as a water distribution conduit. The turbine body 11 allows the integrity of the containment to be maintained, particularly the pressure, the seal and the minimum through section for the fluid passing through the turbine unit 13.

The turbine unit is thus fully disposed inside the conduit. In this embodiment, the turbine unit is thus fully disposed inside the conduit by means of the turbine body 11, which forms a continuation of the conduit and ultimately forms a portion of the conduit.

During normal operation of the turbine 1, shown in FIGS. 1 to 4, the front part of the non-rotating part 2 of the turbine unit 13 is in abutment against the front part of the turbine body 11, particularly the front disk 7. This abutment position is kept stable by the constraint exerted by the flexible elements 4. A free space 17 is present behind the turbine unit, between its outer body and the turbine body 11, to allow rearwards movement of the turbine unit 13, as will now be described.

Indeed, the operation of the turbine 1 according to the embodiment will now be described.

The concept of the turbine 1 according to the invention is to allow the turbine unit to move when it experiences thrust by the fluid that is greater than a predefined threshold during an abnormal fast flow, in order to allow a greater amount of fluid to flow outside the rotor to prevent the turbine unit from undergoing excessively high constraints. In this way, the turbine unit is still subject to a flow that is limited to a maximum selected speed that corresponds to the maximum desired electrical energy to be produced and to the simplicity and cost constraints that are sought for the turbine unit. Combining at least one flexible element with the turbine unit thus forms a device for limiting the speed of the turbine.

Figures 1, 2:
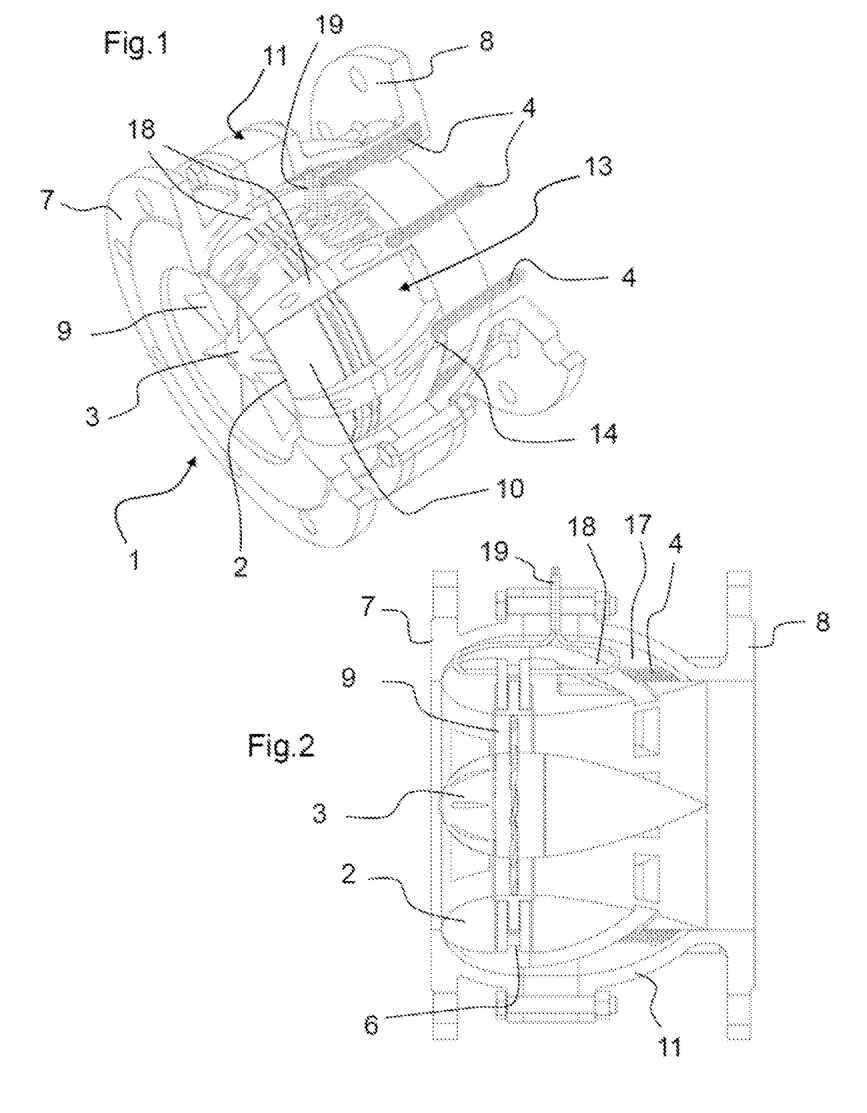
FIG. 1 shows a partially open perspective view of a turbine during normal operation, according to one embodiment of the invention.
FIG. 2 shows a longitudinal section view of the turbine during normal operation, according to the embodiment of the invention.
Figure 3:
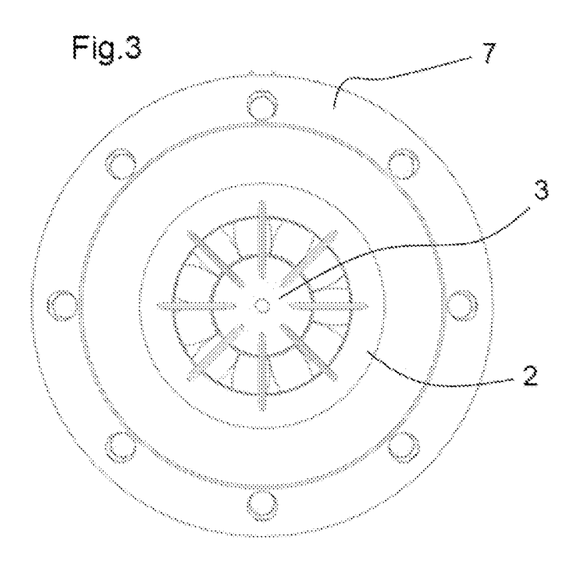
FIG. 3 shows a front view of the inlet of the turbine during normal operation, according to the embodiment of the invention.
Figure 4:
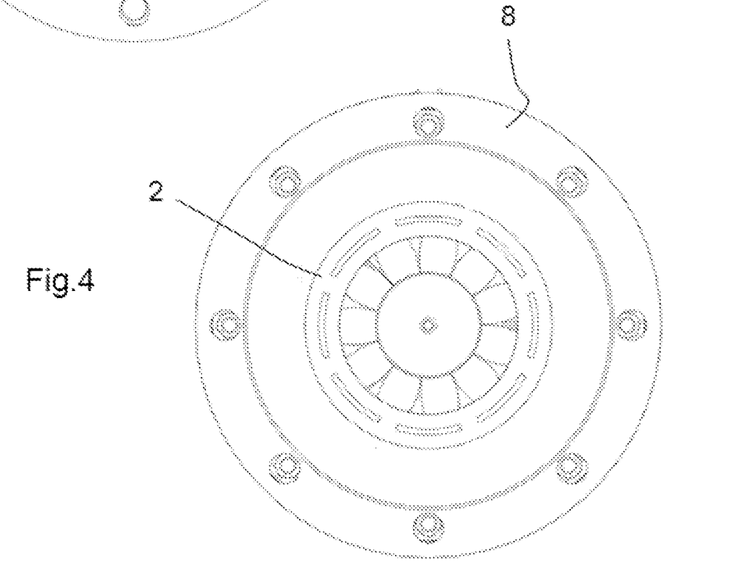
FIG. 4 shows a rear view of the outlet of the turbine during normal operation, according to the embodiment of the invention.
Figure 5:
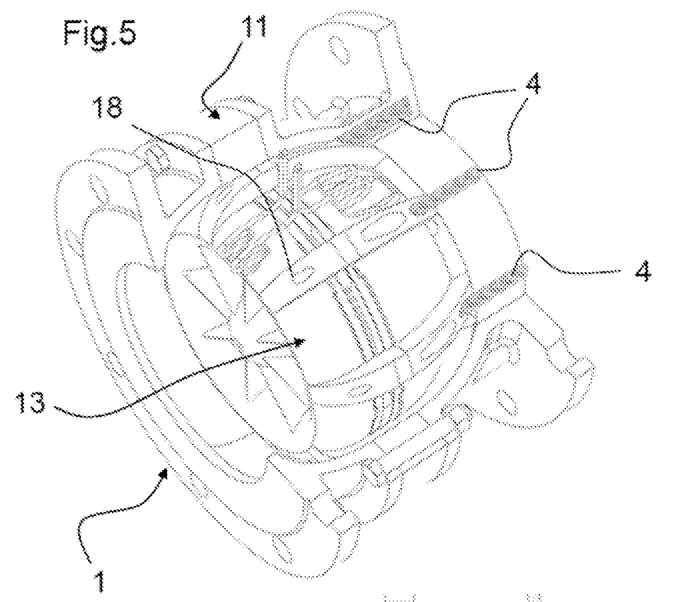
FIG. 5 shows a partially open perspective view of a turbine during overspeed operation, according to the embodiment of the invention.
Figure 6:
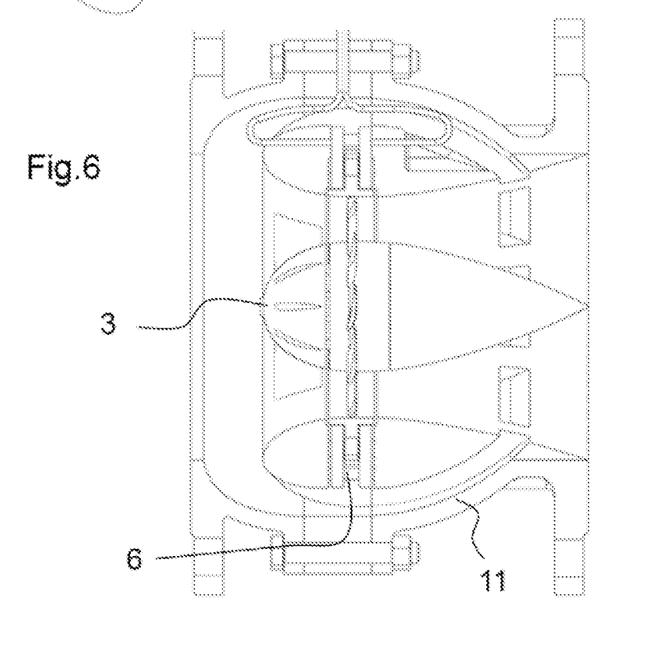
FIG. 6 shows a longitudinal section view of the turbine during overspeed operation, according to the embodiment of the invention.

Therefore, the turbine unit 13 can assume two characteristic positions relative to the turbine body 11, according to the two contemplated operating modes: normal operation, which is described with reference to FIGS. 1 to 4 and 7, and overspeed operation, which is shown in FIGS. 5, 6 and 8. The turbine unit 13 is in normal operation when the flow speed of the fluid exiting the upstream conduit 27 is within a normal speed range, i.e. under a certain threshold. Beyond this threshold, the turbine unit 13 shifts to overspeed operation under the effect of the thrust exerted on its front surface by the fluid, which exceeds the opposing retention force exerted by the flexible elements. Thus, the selection of the flexible elements allows the threshold to be determined for transitioning from normal operation to overspeed operation of the turbine, and therefore indirectly allows the maximum speed or flow rate threshold to be established for the fluid within the turbine unit, as well as the maximum speed of the rotor of the turbine. In the embodiment, the turbine unit 13 translationally moves in the upstream to downstream direction relative to the turbine body 11, if the axial thrust force induced by the flow of the fluid compresses the springs beyond their pre-stress value. This movement occurs along the flow axis of the fluid, coinciding with the longitudinal axis of the turbine.

In particular, the turbine according to the embodiment is adapted to be inserted in conduits with a diameter between 50 mm and 2,000 mm, preferably between 50 mm and 500 mm. In these applications, it is worthwhile establishing the threshold for transitioning the turbine from its normal operation to its overspeed operation for fluid flow speeds that are between 1 m/s and 3 m/s inclusive. This threshold is selected dependently of the maximum speed that can be accepted by the rotor 3 of the turbine unit 13, which preferably should be maintained below a value that is between 1 and 4 thousand revolutions per minute approximately, according to the diameter of the conduit.

In the embodiment of the invention, the transition of the turbine unit from one characteristic position to the next, from normal operation to overspeed operation, and vice versa, is guided along the flow axis of the fluid through the cooperation of the ribs 18 that are arranged on the outer surface of the turbine unit 13 with the inner surface of the turbine body 11. Indeed, these ribs 18 remain in abutment on this inner surface and slide against this surface when the turbine unit moves. This cooperation allows the turbine unit to be radially maintained and helps it to be guided as it moves. FIGS. 5 and 6 show the maximum overspeed operation of the turbine unit. This position is kept stable by a stop on the rear outer surface of the turbine unit 13 on the turbine body 11. To this end, the shapes of the rear outer surface of the turbine unit 13 and of the inner surface of the turbine body 11 match to allow an abutment forming a stop over the entire periphery of the turbine unit, keeping this position radially and axially stable. The springs are then compressed to the maximum. This displaced position remains stable as long as the flow rate of the fluid remains high. As soon as this flow rate returns to a normal value, the turbine unit automatically returns to its normal operation under the effect of the springs that exert a return force and reposition it for normal operation, in frontal abutment.

According to the embodiment, during normal operation, all the fluid originating from the upstream conduit 27 passes through the turbine 1 and thus participates in the rotation of the blades 9 of the rotor 3, as shown by the arrows R in FIG. 7. The front part of the turbine unit 13 is in abutment against the front disk 7 without leaving any space for the passage of the fluid other than the central space where the rotor is located. During overspeed operation, the front part of the turbine unit 13 is moved and positioned in the vicinity of a larger section of the turbine body, which frees a space between its surface outside the turbine unit 13 and the turbine body 11, through which part of the fluid will flow, as shown by the arrows B in FIG. 8. More specifically, this fluid will flow around the turbine unit 13 through the spaces delimited by the ribs 18, which form passageways. This operating principle therefore is schematically shown by FIGS. 7 and 8. The geometry of these spaces (and passageways) is determined to allow a sufficient fluid flow rate outside the rotor in the event of an excessively high fluid flow speed. In an alternative embodiment, part of the fluid exiting the upstream conduit 27 can pass through the turbine 11 without passing through its rotor 3 by any bypass channel other than the passageways around the turbine unit, in the event of an excessively high flow rate. For example, bypass channels can be arranged inside the turbine unit that are closed by valves that only open above a certain thrust exerted by the fluid. The opening of each valve is a function of at least one flexible element. In this case, the turbine unit does not move, it is fixed.

Advantageously, the turbine 1 allows a small amount of electricity to be generated that is adapted to supply electricity to an undemanding device, such as one or more sensor(s) measuring at least one characteristic value of the fluid passing through the conduit, for example, the pH, the temperature, the flow rate, the chemical composition and/or the quality of the fluid. According to the embodiment described herein, the electric power supply means are formed by two electric wires connecting the electric terminals of the generator 6 to the outside of the turbine body 11. These two electric wires are arranged so that the parts of the electric wires that are located outside the turbine body 11 remain independent of the movement of the turbine unit 13. Thus, the invention also relates to a system for measuring at least one characteristic of a fluid flowing in a conduit, comprising at least one sensor capable of measuring at least one characteristic value of a fluid passing through the conduit, the at least one sensor being electrically connected to a turbine for a conduit as previously described, particularly comprising a speed limiting device.

The device for limiting the speed of the turbine as previously described allows the aforementioned disadvantages of the prior art to be overcome and thus allows turbines to be implemented for conduits without having to provide specific overdesigning of the turbine to address any significant speed variations of the fluid passing through the conduit, particularly during the operation of a fire hydrant. The selected solution also dispenses with excessive costs and allows a turbine to be obtained that is adapted to generate a small amount of electrical energy on the basis of a low flow of fluid, and which still operates within a reduced flow speed range, allowing it to remain within operating conditions around its nominal conditions, ensuring a good yield of electricity generation.

Figure 9:
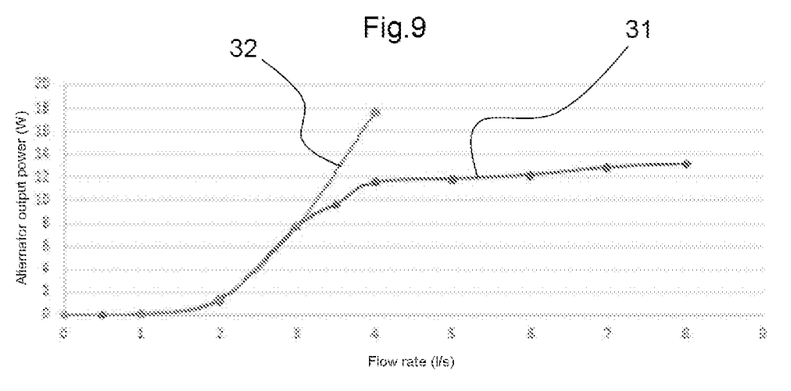
FIG. 9 shows the evolution of the electricity generation of a turbine according to the embodiment of the invention as a function of the flow rate of the fluid circulating in the conduit, thus showing the effect of the invention.

FIG. 9 shows, by way of an example, the electricity generation curve 31 of a turbine according to one embodiment of the invention as a function of the flow rate of fluid circulating in the conduit in which the turbine is installed. By way of a comparison, the figure shows the electricity generation curve 32 of a turbine that is the same size but which will not be equipped with a bypass device like the device of the invention. At low fluid flow rates, the two curves are superposed, the two turbines generate the same electric power. When the flow rate exceeds a threshold, of approximately 3 l/s on this illustrated example, the curve 32 continues to rise and the corresponding turbine certainly is at risk of rapid degradation due to the fact that it is subject to a flow rate exceeding its intake threshold. By contrast, the turbine according to the embodiment of the invention exhibits electricity generation that stabilizes, increasing very slightly, at a value corresponding to a maximum acceptable flow rate for the turbine: this stabilization corresponds to the bypass phase of part of the fluid flow rate outside the turbine.

Of course, the invention is not limited to the embodiment described. In particular, the turbine unit can adopt any other geometry. Furthermore, its cooperation with at least one flexible element can be different, and its movement can be of a different type, not necessarily a translation movement. The turbine body 11 is advantageous in that it allows a whole to be formed with the movable turbine unit, ready for connection with existing conduits. However, by way of a variation, the turbine unit and its one or more flexible element(s) can be arranged directly inside an existing conduit, without requiring a turbine body. Moreover, part of the fluid also can flow outside the turbine during normal operation, but a larger amount of fluid will flow outside the turbine during overspeed operation.

The invention claimed is:

1. An electricity generation turbine for a conduit, comprising:
   a turbine unit including a rotor, and
   at least one flexible element,
   wherein the at least one flexible element is connected to the turbine unit, so as to limit a flow rate of fluid passing through the rotor in order to limit a rotational speed of the rotor of the turbine unit, and
   wherein the turbine unit comprises a non-rotating part encompassing a stator of a generator, disposed in an annular configuration, the at least one flexible element being connected to the non-rotating part,
   wherein the connection of the at least one flexible element with the turbine unit is so that the thrust generated by the fluid on the turbine unit is able to cause the turbine unit to move against the at least one flexible element if the thrust of the fluid exceeds a predefined threshold, and
   wherein the turbine unit is translationally movable along a flow axis of the fluid, coinciding with a longitudinal axis of the turbine.

2. The electricity generation turbine for a conduit according to claim 1, wherein the connection between the turbine unit and the at least one flexible element is so that the flexible element keeps the turbine unit in its initial position during normal operation if the rotational speed of the rotor of the turbine unit is below a predefined speed threshold.

3. The electricity generation turbine for a conduit according to claim 2, wherein the predefined speed threshold of the rotor is in a range of from 1,000 to 4,000 revolutions per minute.

4. The electricity generation turbine for a conduit according to claim 1, wherein the at least one flexible element is pre-stressed during its assembly with the turbine unit, so as to maintain the stability of normal operation of the turbine unit, during which the rotational speed of the rotor of the turbine unit is below a predefined speed threshold.

5. The electricity generation turbine for a conduit according to claim 1, wherein the turbine unit is configured to be positioned inside the conduit or a turbine body carrying a fluid, and wherein part of the at least one flexible element is connected to the turbine unit and another part is configured to be connected to the conduit or the turbine body, so that the turbine unit is flexibly movable relative to the conduit or the turbine body.

6. The electricity generation turbine for a conduit according to claim 5, wherein the turbine unit has an inlet end for the fluid and an outlet end for the fluid, and wherein the turbine unit is provided with at least one rear stop for the at least one flexible element, the first end of which is fixed on the rear stop and the second end of which is fixed to the conduit or to the turbine body.

7. The electricity generation turbine for a conduit according to claim 6, wherein the at least one flexible element is a linear spring.

8. The electricity generation turbine for a conduit according to claim 5, wherein, during normal operation of the turbine unit, the non-rotating part of the turbine unit is in abutment against the turbine body or a surface of the conduit, so that all the fluid originating from an upstream conduit passes through the rotor of the turbine unit.

9. The electricity generation turbine for a conduit according to claim 1, comprising a turbine body, the turbine unit being arranged inside the turbine body, and wherein the non-rotating part has an outer surface cooperating with an inner surface of the turbine body.

10. The electricity generation turbine for a conduit according to claim 9, wherein an internal volume of the turbine body has a variable section in the longitudinal direction, so that when the turbine unit is moved during overspeed operation against the at least one flexible element under the effect of the thrust of the fluid, a front part of the turbine unit is located in a zone with a section of the turbine body rather than when the turbine unit is in normal, non-moved, operation, so as to allow a greater amount of the fluid flowing in the turbine body to pass outside the rotor of the turbine unit.

11. The electricity generation turbine for a conduit according to claim 10, wherein, when the turbine unit is in the overspeed operation, there is an increase in the flow rate of the fluid flowing between the inner surface of the turbine body and the outer surface of the non-rotating part of the turbine unit.

12. The electricity generation turbine for a conduit according to claim 9, wherein the turbine body is made up of a front semi-body and a rear semi-body, wherein the at least one flexible element is connected, on the one hand, to the turbine unit, and, on the other hand, to the rear semi-body of the turbine body, and wherein the inner surface of the turbine body is in contact with the outer surface of the turbine unit, so as to guide the movement of the turbine unit when the unit switches from normal operation to overspeed operation, or vice versa, under the effect of the thrust of the fluid.

13. The electricity generation turbine for a conduit according to claim 9, wherein the turbine body comprises two disks, including a first front disk forming a connection device for an upstream conduit and a second rear disk forming a connection device for a downstream conduit.

14. A system for measuring at least one characteristic of a fluid flowing in a conduit, comprising:
   at least one sensor capable of measuring at least one characteristic value of a fluid passing through the conduit,
   wherein the at least one sensor is electrically connected to an electricity generation turbine for a conduit according to claim 1 in order to supply the at least one sensor with power.

15. The electricity generation turbine for a conduit according to claim 1, wherein the thrust generated by the fluid on the turbine unit is able to cause the turbine unit to move against the at least one flexible element along the flow axis of the fluid.

* * * * *